US012636622B2

(12) United States Patent
Liao et al.

(10) Patent No.: US 12,636,622 B2
(45) Date of Patent: May 26, 2026

(54) PREPARATION METHOD OF REVERSE OSMOSIS COMPOSITE MEMBRANE AND REVERSE OSMOSIS COMPOSITE MEMBRANE PREPARED THEREBY

(71) Applicant: Hunan Ovay Film Technology Co., Ltd., Hunan (CN)

(72) Inventors: Qian Liao, Hunan (CN); Hongwei Lu, Hunan (CN); Bo Peng, Hunan (CN); Tao Huang, Hunan (CN); Fuquan Xie, Hunan (CN); Xiangyou Chen, Hunan (CN); Pengfei Li, Hunan (CN)

(73) Assignee: Hunan Ovay Film Technology Co., Ltd., Zhuzhou (CN)

( * ) Notice: Subject to any disclaimer, the term of this patent is extended or adjusted under 35 U.S.C. 154(b) by 330 days.

(21) Appl. No.: 18/328,199

(22) Filed: Jun. 2, 2023

(65) Prior Publication Data

US 2024/0024827 A1 Jan. 25, 2024

(30) Foreign Application Priority Data

Jul. 21, 2022 (CN) .......................... 202210869611.4

(51) Int. Cl.
*B01D 69/12* (2006.01)
*B01D 67/00* (2006.01)
(Continued)

(52) U.S. Cl.
CPC ..... *B01D 69/1251* (2022.08); *B01D 69/1071* (2022.08); *B01D 71/56* (2013.01); *B01D 61/025* (2013.01)

(58) Field of Classification Search
CPC ............ B01D 69/1251; B01D 69/1071; B01D 71/56; B01D 61/025; B01D 67/0037;
(Continued)

(56) References Cited

FOREIGN PATENT DOCUMENTS

| | | | | | |
|---|---|---|---|---|---|
| CN | 108159892 A | * | 6/2018 | ............. | B01D 69/10 |
| JP | 2011101837 A | | 5/2011 | | |

OTHER PUBLICATIONS

English language machine translation of JP2011-101837A, 12 pages, No Date.*

(Continued)

*Primary Examiner* — Pranav N Patel

(57) ABSTRACT

The present disclosure provides a preparation method of a reverse osmosis composite membrane, including the following steps: coating a gelatin solution on a non-woven fabric layer and cooling to form a gelatin gel layer; coating a salt solution on a surface of the gelatin gel layer to obtain a gel/non-woven fabric composite membrane; placing the gel/non-woven fabric composite membrane in an aqueous phase solution, transferring into an oil phase solution, and conducting interfacial polymerization to obtain a non-woven fabric/gel/polyamide composite membrane; placing the non-woven fabric/gel/polyamide composite membrane in water, and heating to remove the gelatin gel layer to obtain a non-woven fabric/polyamide composite membrane; and introducing a trimesoyl chloride (TMC) gas from a side where the non-woven fabric layer is away from a polyamide layer in the non-woven fabric/polyamide composite membrane, conducting gas-liquid interfacial polymerization by chemical vapor deposition (CVD), and drying to obtain the reverse osmosis composite membrane.

7 Claims, 1 Drawing Sheet

(51) Int. Cl.
    *B01D 69/10*       (2006.01)
    *B01D 71/56*       (2006.01)
    *B01D 61/02*       (2006.01)
(58) Field of Classification Search
    CPC .. B01D 69/105; B01D 69/12; B01D 67/0079;
                  Y02A 20/131; C02F 1/441
    See application file for complete search history.

(56)             References Cited

OTHER PUBLICATIONS

Journal of Membrane Science 588 (2019) 117192. (Year: 2019).*
English language machine translation of CN108159892, 9 pages,
No Date.*
The Effect of Salts on the Ionisation of Gelatin. J Gen Physiol. Nov.
20, 1930;14(2):215-22 (Year: 1930).*
Green Chem., 2021, 23, 2449â2456. (Year: 2021).*
Chinese Patent Office, Office Action issued in CN 202210869611.4
dated Jan. 5, 2023.

* cited by examiner

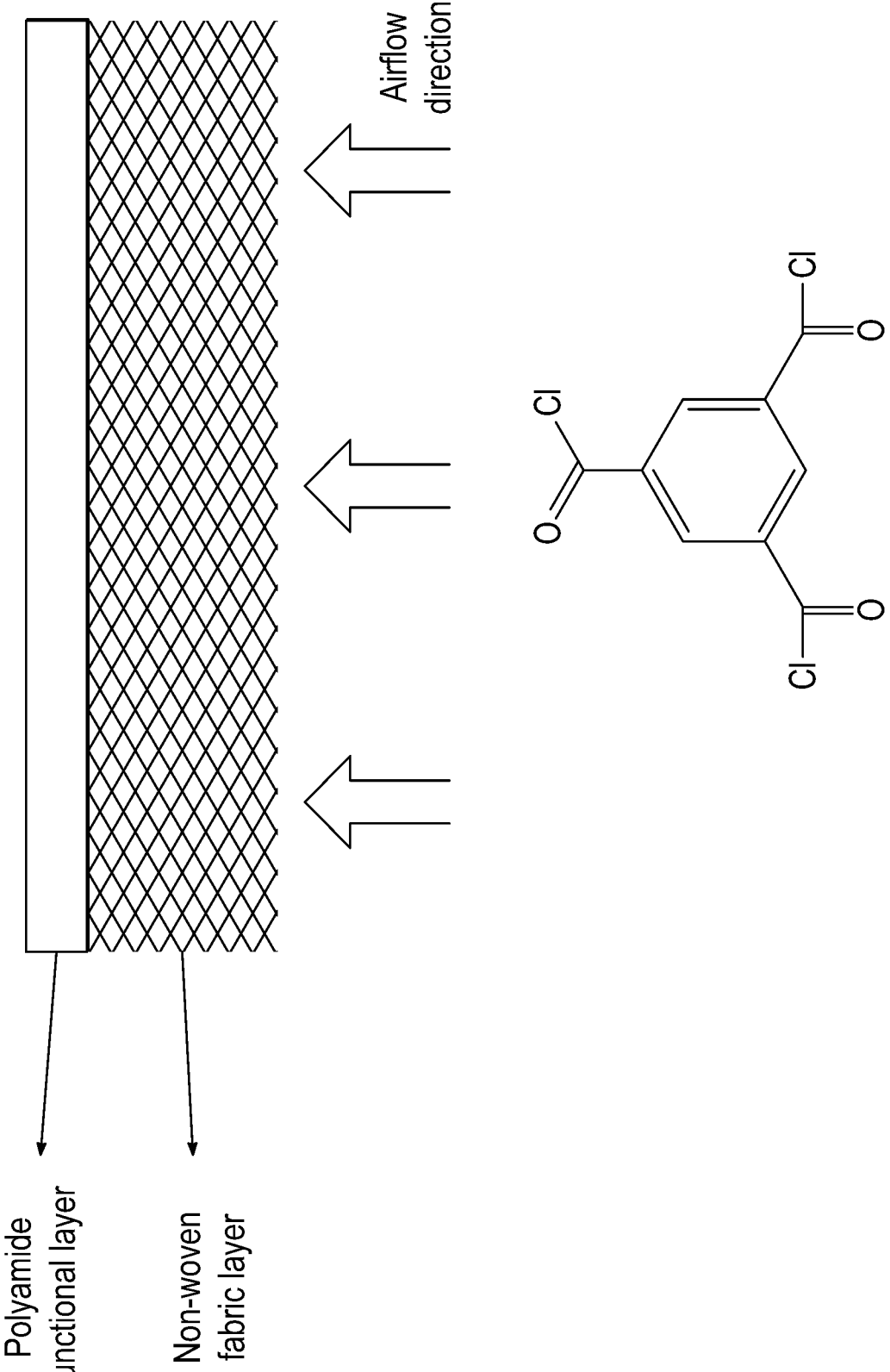

PREPARATION METHOD OF REVERSE OSMOSIS COMPOSITE MEMBRANE AND REVERSE OSMOSIS COMPOSITE MEMBRANE PREPARED THEREBY

CROSS REFERENCE TO RELATED APPLICATION

This patent application claims the benefit and priority of Chinese Patent Application No. 2022108696114, filed with the China National Intellectual Property Administration on Jul. 21, 2022, the disclosure of which is incorporated by reference herein in its entirety as part of the present application.

TECHNICAL FIELD

The present disclosure relates to the technical field of reverse osmosis composite membranes, in particular to a preparation method of a reverse osmosis composite membrane and a reverse osmosis composite membrane prepared thereby.

BACKGROUND

As one of the most important technologies in water treatment, reverse osmosis has demonstrated its excellent performances in the fields of seawater desalination, pure water preparation, and reclaimed water reuse. The reverse osmosis membrane is a core of the reverse osmosis. At present, the main reverse osmosis membranes in the world include cellulose acetate reverse osmosis composite membranes and polyamide reverse osmosis composite membranes. The cellulose acetate reverse osmosis composite membranes are less used due to poor heat resistance, easy biological degradation, and high operating pressure. The polyamide reverse osmosis composite membranes have become a mainstream product in the current market due to desirable thermal, mechanical, and chemical stabilities. Water flux and desalination rate are the two most important performance parameters of reverse osmosis membranes. Higher water flux means lower energy consumption in treating the same volume of liquid. A higher desalination rate indicates a more desirable quality of the treated water, and a reduced risk of further after-treatment in the water treatment project.

A traditional polyamide reverse osmosis composite membrane mainly includes three layers, namely a non-woven fabric layer, a polysulfone microporous support, and a polyamide functional layer. The non-woven fabric layer primarily provides a mechanical strength to the composite membrane. Due to generally irregular surface and higher porosity, it is difficult for a non-woven fabric to form a complete and ultra-thin polyamide functional layer directly through interfacial polymerization. Therefore, it is further necessary to pre-coat a layer of the polysulfone microporous support on the non-woven fabric and then conduct the interfacial polymerization to form the polyamide functional layer.

Meanwhile, in the current industrialized preparation of polyamide reverse osmosis composite membranes, a material cost of the non-woven fabric layer and the polysulfone microporous support is a main preparation cost of the reverse osmosis composite membranes. The non-woven fabric is mainly from Japan, and the polysulfone is mainly from the United States. Accordingly, on one hand, it is necessary to further improve a performance of the polyamide reverse osmosis membrane, reduce energy consumption during use, and improve a quality of produced water. On the other hand, there is also a need to reduce a high manufacturing cost of the polyamide reverse osmosis composite membranes. The above two factors are the two main reasons hindering the further development of reverse osmosis membrane technology.

In summary, there is an urgent need for a preparation method of a low-cost reverse osmosis composite membrane and a reverse osmosis composite membrane, so as to solve the above problems in the prior art.

SUMMARY

An objective of the present disclosure is to provide a preparation method of a low-cost reverse osmosis composite membrane. To achieve the above objective, the present disclosure adopts the following technical solutions:

The present disclosure provides a preparation method of a reverse osmosis composite membrane, including the following steps:

S1: coating a gelatin solution on a non-woven fabric layer and cooling to form a gelatin gel layer; coating a salt solution on a surface of the gelatin gel layer to obtain a gel/non-woven fabric composite membrane;

S2: placing the gel/non-woven fabric composite membrane in an aqueous phase solution, transferring into an oil phase solution, and conducting interfacial polymerization to obtain a non-woven fabric/gel/polyamide composite membrane;

S3: placing the non-woven fabric/gel/polyamide composite membrane in water, and heating to remove the gelatin gel layer to obtain a non-woven fabric/polyamide composite membrane; and S4: introducing a trimesoyl chloride (TMC) gas from a side where the non-woven fabric layer is away from a polyamide layer in the non-woven fabric/polyamide composite membrane, conducting gas-liquid interfacial polymerization by chemical vapor deposition (CVD), and drying to obtain the reverse osmosis composite membrane.

Preferably, the salt solution is a calcium chloride solution.

Preferably, a solute of the aqueous phase solution is at least one selected from the group consisting of m-phenylenediamine, p-phenylenediamine, and o-phenylenediamine; and the aqueous phase solution has a concentration of 2 wt % to 5 wt %.

Preferably, the oil phase solution has a solute being at least one selected from the group consisting of TMC, phthaloyl chloride, terephthaloyl chloride, and isophthaloyl chloride, and a solvent being at least one selected from the group consisting of n-hexane, Isopar G, n-heptane, and n-octane; and the oil phase solution has a concentration of 0.05% to 0.2%.

Preferably, the gelatin gel layer has a thickness of 30 μm to 50 μm.

Preferably, a solute in the salt solution has a loading amount of 0.3 mg/cm$^2$ to 0.6 mg/cm$^2$.

Preferably, the gas-liquid interfacial polymerization is conducted for 1 h to 3 h.

The present disclosure further provides a reverse osmosis composite membrane prepared by the preparation method.

Preferably, the reverse osmosis composite membrane includes a non-woven fabric layer and a polyamide layer arranged on the non-woven fabric layer.

Preferably, the non-woven fabric layer is prepared by at least one selected from the group consisting of polypropylene, polyester, cellulose, and nylon, and has an air permeability of 1 cm$^3$/cm$^2$/s to 3 cm$^3$/cm$^2$/s.

The technical solutions adopted in the present disclosure have the following beneficial effects:

(1) In the present disclosure, a reverse osmosis composite membrane prepared by the preparation method has reduced polysulfone microporous support compared with a traditional reverse osmosis composite membrane. Moreover, the gelatin gel layer serving as a temporary support during the preparation can also be recycled repeatedly through its solidification characteristics, thereby reducing a preparation cost of the reverse osmosis composite membrane. In addition, the preparation method obtains a polyamide layer through interfacial polymerization in step S2. After the gelatin gel layer is removed, a TMC gas is introduced from a side where the non-woven fabric layer is away from the polyamide layer, such that the TMC and residual amino groups in the formed polyamide functional layer undergo gas-liquid interfacial polymerization. In this way, the polyamide functional layer grows towards the non-woven fabric layer, and formed polyamide has a higher degree of cross-linking and is more firmly combined with the non-woven fabric.

(2) In the present disclosure, the gelatin gel layer is used as a temporary support. The gelatin has desirable hydrophilicity, can absorb more aqueous phase solutions, and can react with more oil phase solutions during subsequent interfacial polymerization. Therefore, the formed polyamide functional layer has higher degree of cross-linking and thickness, is not easily damaged, and shows an improved desalination rate of the membrane. In addition, calcium chloride is coated on a surface of the gelatin gel layer. Since the calcium chloride can form cross-linked calcium bridges to enhance surface strength and smoothness of the gelatin gel layer, it is beneficial to the interfacial polymerization and the formation of polyamide functional layer on the surface. Moreover, during the subsequent interfacial polymerization, some calcium ions can also diffuse into the oil phase and exist in a cross-linked network structure of the polyamide functional layer. Ultimately, the calcium ions are washed away to form additional nanopore structures that increase a membrane flux.

(3) In the present disclosure, since the reverse osmosis composite membrane has no polysulfone microporous support, the resistance may be reduced during the water mass transfer. In this way, compared with a reverse osmosis composite membrane prepared by the traditional method, both the membrane flux and the desalination rate have been improved. The reverse osmosis composite membrane prepared by this method has a water flux of 84.5 LMH to 85.1 LMH and a desalination rate of 99.56% to 99.59%, under an operating pressure of 150 lbf/in$^2$ in raw water of a NaCl aqueous solution with a mass concentration of 1,500 ppm at 25° C. and a pH value of 6.5 to 7.5.

The present disclosure may have other objectives, features and advantages than the objectives, features and advantages as described above. The present disclosure will be further described below in detail with reference to accompanying drawings.

BRIEF DESCRIPTION OF THE DRAWINGS

The accompanying drawings constituting a part of the present disclosure provide further understanding of the present disclosure. Schematic embodiments of the present disclosure and description thereof are intended to illustrate the present disclosure and do not constitute an undue limitation on the present disclosure.

FIG. 1 shows a schematic diagram of a reaction in step S4 in preferred Example 1 of the present disclosure.

DETAILED DESCRIPTION OF THE EMBODIMENTS

Examples of the present disclosure are described in detail below with reference to the accompanying drawings, but the present disclosure can be implemented in a variety of different modes limited and involved by the claims.

Example 1

Referring to FIG. 1, a preparation method of a reverse osmosis composite membrane included the following steps:

S1: a gelatin solution with a concentration of 2 wt % to 5 wt % (5 wt % in this example) was coated on a non-woven fabric layer, and cooled (at 25° C.) to form a gelatin gel layer with a thickness of 30 μm to 50 μm (30 μm in this example); a calcium chloride solution with a concentration of 0.8 wt % was coated on a surface of the gelatin gel layer to obtain a gel/non-woven fabric composite membrane;

S2: the gel/non-woven fabric composite membrane was placed in an aqueous phase solution with a concentration of 2 wt % to 5 wt % (3 wt % in this example), transferred into an oil phase solution with a concentration of 0.05% to 0.2% (0.1 wt % in this example), and interfacial polymerization was conducted to obtain a non-woven fabric/gel/polyamide composite membrane;

S3: the non-woven fabric/gel/polyamide composite membrane was placed in water, and the gelatin gel layer was removed by heating (at 70° C.) to obtain a non-woven fabric/polyamide composite membrane; and S4: a TMC gas was introduced from a side where the non-woven fabric layer was away from a polyamide layer in the non-woven fabric/polyamide composite membrane, gas-liquid interfacial polymerization was conducted by CVD for 1 h to 3 h (1 h in this example), and dried to obtain the reverse osmosis composite membrane.

In this example, a solute of the aqueous phase solution was m-phenylenediamine.

In this example, the oil phase solution had TMC as a solute and n-hexane as a solvent.

In this example, the calcium chloride had a loading amount of 0.3 mg/cm$^2$.

In this example, the non-woven fabric layer was prepared by polyethylene terephthalate, and had an air permeability of 1 cm$^3$/cm$^2$/s.

Example 2

This example differed from Example 1 in that: the calcium chloride had a loading amount of 0.5 mg/cm$^2$, and the calcium chloride solution had a concentration of 1 wt %; in step S4, the gas-liquid interfacial polymerization was conducted for 2 h. Other unmentioned parts were the same as those in Example 1.

Example 3

This example differed from Example 1 in that: the calcium chloride had a loading amount of 0.6 mg/cm$^2$, and the calcium chloride solution had a concentration of 1.2 wt %; in step S4, the gas-liquid interfacial polymerization was conducted for 3 h. Other unmentioned parts were the same as those in Example 1.

Comparative Example 1

This example differed from Example 1 in that: the calcium chloride had a loading amount of 0.25 mg/cm², and the calcium chloride solution had a concentration of 0.5 wt %; in step S4, the gas-liquid interfacial polymerization was conducted for 0.5 h. Other unmentioned parts were the same as those in Example 1.

Comparative Example 2

This example differed from Example 1 in that: the calcium chloride had a loading amount of 0.75 mg/cm², and the calcium chloride solution had a concentration of 1.5 wt %; in step S4, the gas-liquid interfacial polymerization was conducted for 4 h. Other unmentioned parts were the same as those in Example 1.

Comparative Example 3

This example differed from Example 1 in that: there was no step S4. Other unmentioned parts were the same as those in Example 1.

Comparative Example 4

This example differed from Example 1 in that: the calcium chloride solution was not coated. Other unmentioned parts were the same as those in Example 1.

Comparative Example 5 step 1, preparation of a microporous support: a 18 wt % polysulfone solution was prepared, undissolved impurities were removed by filtration, vacuum degassing was conducted, an obtained polymer solution was evenly coated on a non-woven fabric using a scraper, and then the non-woven fabric was treated in a pure water coagulation bath at 15° C. for 1 min, and a membrane was formed by phase inversion, and then washed to obtain the microporous support;

step 2, preparation of an aqueous phase solution: an m-phenylenediamine aqueous solution was prepared with a concentration of 3 wt %;

step 3, preparation of an oil phase solution: TMC was prepared with a concentration of wt % using n-hexane as an oil phase solvent; and step 4, interfacial polymerization: the microporous support was immersed in the aqueous phase solution for 30 s, taken out to remove excess water on its surface, immersed in the oil phase solution for 10 s to conduct interfacial polymerization, and then dried in an oven at 60° C. to obtain a reverse osmosis composite membrane.

Comparative Example 6 step 1, preparation of a microporous support: a 18 wt % polysulfone solution was prepared, undissolved impurities were removed by filtration, vacuum degassing was conducted, an obtained polymer solution was evenly coated on a non-woven fabric using a scraper, and then the non-woven fabric was treated in a pure water coagulation bath at 15° C. for 1 min, and a membrane was formed by phase inversion, and then washed to obtain the microporous support;

step 2, preparation of an aqueous phase solution: an m-phenylenediamine aqueous solution was prepared with a concentration of 3 wt %;

step 3, preparation of an oil phase solution: TMC was prepared with a concentration of wt % using n-hexane as an oil phase solvent; and step 4, interfacial polymerization: the microporous support was immersed in the aqueous phase solution for 30 s, taken out to remove excess water on its surface, and immersed in the oil phase solution for 10 s to conduct interfacial polymerization, to obtain a reverse osmosis composite membrane; and step 5, a TMC gas was introduced from a side where the non-woven fabric layer was away from a polyamide layer in the reverse osmosis composite membrane obtained in step 4, gas-liquid interfacial polymerization was conducted by CVD for 1 h, and dried to obtain the reverse osmosis composite membrane.

Membrane Performance Test:

The reverse osmosis composite membranes prepared in Examples 1 to 3 and the reverse osmosis composite membranes prepared in Comparative Examples 1 to 6 were placed on a cross-flow membrane detection platform. The test was conducted under an operating pressure of 150 lbf/in² in raw water of a NaCl aqueous solution with a mass concentration of 1,500 ppm at and a pH value of 6.5 to 7.5. A water flux (J) and a desalination rate (R) of the reverse osmosis composite membrane were calculated according to formula 1) and formula 2), respectively.

Calculation formula 1)

$$J = \frac{V}{S \cdot t}$$

The water flux (J) referred to a volume (V) of water passing through a unit membrane area (S) per unit time (t) under certain operating conditions, in $L \cdot m^{-2} \cdot h^{-1}$; where V was a volume of permeate (in L); S was an effective surface area of the reverse osmosis composite membrane (in m²); and t was a water penetration time (in h).

Calculation formula 2)

$$R = \left(1 - \frac{C_p}{C_f}\right) \times 100\%$$

R represented a solute removal rate of the reverse osmosis composite membrane, that is, the desalination rate (%); and $C_p$ represented a concentration of the permeate after the raw water passed through the reverse osmosis composite membrane, and $C_f$ represented a concentration of the raw water.

Membrane Pressure Performance Test

After testing an average water flux and an average desalination rate of the reverse osmosis composite membrane, an operating pressure was adjusted to 600 lbf/in² (4 times the original operating pressure), and the membrane was tested under the same conditions for 180 min. The operating pressure was adjusted to a normal pressure for testing, and the average water flux and average desalination rate of the reverse osmosis composite membrane at a high pressure were calculated according to formula a) and formula b), respectively.

TABLE 1

| Experimental examples | Average water flux (LMH) | Average desalination rate (%) | Average water flux (LMH) of pressure-resistant test | Average desalination rate (%) of pressure-resistant test |
|---|---|---|---|---|
| Example 1 | 85.1 | 99.56 | 84.0 | 99.59 |
| Example 2 | 84.5 | 99.59 | 83.6 | 99.61 |
| Example 3 | 84.9 | 99.59 | 83.3 | 99.60 |
| Comparative Example 1 | 79.5 | 99.42 | 76.8 | 99.45 |
| Comparative Example 2 | 95.5 | 99.18 | 102.6 | 98.25 |
| Comparative Example 3 | 90.3 | 99.39 | 86.7 | 99.41 |
| Comparative Example 4 | 97.9 | 98.59 | 112.0 | 96.52 |
| Comparative Example 5 | 35.6 | 99.38 | 34.8 | 99.40 |
| Comparative Example 6 | 35.0 | 99.39 | 33.0 | 99.43 |

Performance comparison or reverse osmosis composite membranes obtained in Examples 1 to 3 and Comparative Examples 1 to 6 (20 pieces were tested from each example and comparative example)

It was seen from the experimental test data of Examples 1 to 3 and Comparative Example 5 that the reverse osmosis composite membrane prepared by this method had a better performance than that of the reverse osmosis composite membrane prepared by a traditional method. The water flux was increased by 1.37 to 1.39 times, and the desalination rate of the membrane was also higher than that of Comparative Example 5, reaching more than 99.56%. Compared with traditional interfacial polymerization, after reducing the polysulfone layer, the membrane showed reduced water mass transfer resistance, increased extra nanoporous structure, and increased flux. Meanwhile, after the gas-liquid interfacial polymerization, the membrane had further increased degree of cross-linking and enhanced desalination rate. This indicated that the reverse osmosis composite membrane of the present disclosure maintained a high desalination rate on the basis of maintaining a high flux.

From Example 1 to 3 and Comparative Example 1 to 2, it was seen that when the loading amount of calcium chloride was only 0.25 mg/cm$^2$, and the gas-liquid interfacial polymerization was conducted for 0.5 h, the flux and desalination rate of the membrane were decreased. The main reason was that anhydrous calcium chloride was washed away after interfacial polymerization to form fewer nanopores, resulting in a decreased flux. Moreover, the gas-liquid interfacial polymerization lasted for a short time, such that the degree of cross-linking of the membrane was relatively reduced, resulting in a decreased desalination rate. However, when the loading amount of calcium chloride reached 0.75 mg/cm$^2$, and the gas-liquid interfacial polymerization was conducted for 4 h, the membrane had increased flux and a greater decrease in the desalination rate. The main reason was that the loading amount of calcium chloride was too high, and directly affected the interfacial polymerization of the aqueous phase and the oil phase, resulting in defects in the formed polyamide functional layer. Moreover, these defect points were washed away during the pressure-resistant test, resulting in a substantial increase in flux and a substantial decrease in desalination rate. In addition, during the gas-liquid interfacial polymerization, as the remaining amino groups were gradually reacted, further increasing a reaction time of the gas-liquid interfacial polymerization could not further increase the degree of cross-linking for the polyamide functional layer.

It was seen from Examples 1 to 3 and Comparative Example 3 that when there was no gas-liquid interfacial polymerization, the membrane had an increase in flux, but a large decrease in the desalination rate. Although this membrane showed a desirable performance in the pressure-resistant test, there was still a risk of peel-off in actual use.

It was seen from Examples 1 to 3 and Comparative Example 4 that when no calcium chloride was loaded, the membrane showed an increased flux and a decreased desalination rate. This was mainly because the gelatin layer had low surface strength and was not smooth enough, and the formed polyamide functional layer produced relatively large defects. As a result, during the pressure-resistant test, these defect points were washed away and the membrane was damaged, such that the membrane had increased flux and decreased desalination rate.

From Comparative Examples 5 to 6, it was seen that the polyamide reverse osmosis composite membrane prepared by the traditional method underwent gas-liquid interfacial polymerization again, but the desalination rate of the membrane did not increase significantly. The reason was that the traditional polyamide reverse osmosis membrane had a polysulfone layer, such that there was a certain barrier effect between the TMC gas and the polyamide layer, making it difficult to conduct the gas-liquid interfacial polymerization.

The above description is merely preferred embodiments of the present disclosure and is not intended to limit the present disclosure, and various changes and modifications of the present disclosure may be made by those skilled in the art. Any modifications, equivalent substitutions, improvements, etc. made within the spirit and scope of the present disclosure should be included within the protection scope of the present disclosure.

What is claimed is:

1. A preparation method of a reverse osmosis composite membrane, comprising the following steps:
   S1: coating a gelatin solution on a non-woven fabric layer and cooling to form a gelatin gel layer; coating a salt solution on a surface of the gelatin gel layer to obtain a gel/non-woven fabric composite membrane;
   S2: placing the gel/non-woven fabric composite membrane in an aqueous phase solution, transferring into an oil phase solution, and conducting interfacial polymerization to obtain a non-woven fabric/gel/polyamide composite membrane;
   S3: placing the non-woven fabric/gel/polyamide composite membrane in water, and heating to remove the gelatin gel layer to obtain a non-woven fabric/polyamide composite membrane; and
   S4: introducing a trimesoyl chloride (TMC) vapor from a side where the non-woven fabric layer is away from a polyamide layer in the non-woven fabric/polyamide composite membrane, conducting gas-liquid interfacial polymerization by chemical vapor deposition (CVD), and drying to obtain the reverse osmosis composite membrane.

2. The preparation method according to claim 1, wherein the salt solution is a calcium chloride solution.

3. The preparation method according to claim 1, wherein a solute of the aqueous phase solution is at least one selected from the group consisting of m-phenylenediamine, p-phenylenediamine, and o-phenylenediamine; and the aqueous phase solution has a concentration of 2 wt % to 5 wt %.

4. The preparation method according to claim 1, wherein the oil phase solution has a solute being at least one selected from the group consisting of TMC, phthaloyl chloride, terephthaloyl chloride, and isophthaloyl chloride, and a solvent being at least one selected from the group consisting of n-hexane, Isopar G, n-heptane, and n-octane; and the oil phase solution has a concentration of 0.05% to 0.2%.

5. The preparation method according to claim 1, wherein the gelatin gel layer has a thickness of 30 μm to 50 μm.

6. The preparation method according to claim 2, wherein a solute in the salt solution has a loading amount of 0.3 mg/cm$^2$ to 0.6 mg/cm$^2$.

7. The preparation method according to claim 1, wherein the gas-liquid interfacial polymerization is conducted for 1 h to 3 h.

\* \* \* \* \*